(12) United States Patent
Du Plessis

(10) Patent No.: US 6,206,941 B1
(45) Date of Patent: Mar. 27, 2001

(54) APPARATUS AND PROCESS FOR CARBONIZATION AND ACTIVATION OF CARBONACEOUS MATERIALS

(76) Inventor: Cornelius J. Du Plessis, 180 Dover Furnace Rd., Dover Plains, NY (US) 12522

(*) Notice: Subject to any disclaimer, the term of this patent is extended or adjusted under 35 U.S.C. 154(b) by 0 days.

(21) Appl. No.: 09/001,959

(22) Filed: Jan. 2, 1998

Related U.S. Application Data

(60) Provisional application No. 60/034,216, filed on Jan. 3, 1997.

(51) Int. Cl.[7] .............................. C10B 1/00; C01B 31/08; F27D 3/00; B01J 37/34
(52) U.S. Cl. .............................. 48/111; 48/101; 202/211; 201/19; 201/27; 201/29; 201/214; 373/115; 502/5; 502/55
(58) Field of Search .............................. 422/150; 373/115; 502/5, 55; 48/101, 111; 201/27, 29, 214, 19; 202/211

(56) References Cited

U.S. PATENT DOCUMENTS

| 3,977,947 | * | 8/1976 | Pyle ................................ 48/111 |
|---|---|---|---|
| 4,273,619 | * | 6/1981 | Angelo, II ........................ 202/211 |
| 5,089,457 | * | 2/1992 | Gaylard et al. .................... 502/5 |
| 5,190,901 | * | 3/1993 | Hirai ............................... 201/19 |
| 5,406,582 | * | 4/1995 | Du Plessis ........................ 373/115 |

* cited by examiner

Primary Examiner—Hien Tran
(74) Attorney, Agent, or Firm—Joseph B. Taphorn

(57) ABSTRACT

An apparatus for converting carbonaceous raw materials into a carbonized product and activating the product, includes a device for heating the carbonaceous raw materials to form a carbonized product, and equipment for activating the carbonized product and supplying by-product of the activation to the device to help in the heating. The device heats a column of carbonaceous raw materials to pyrolize it and form a carbonized product and vapors and gases. Upward flow of the gases and vapors is restrained so that they flow, with the carbonized product, out of the bottom of the column where they are burned in a combustion box and the resultant hot gases used to heat the column through a tube defining the column. Descending carbonized materials pass rapidly through the combustion box into the equipment which through electical resistance heating and steam, activates the carbonized materials and passes gas and vapor by-products thereby created up into the combustion box to help fuel the heating of the raw materials.

6 Claims, 2 Drawing Sheets

US 6,206,941 B1

APPARATUS AND PROCESS FOR CARBONIZATION AND ACTIVATION OF CARBONACEOUS MATERIALS

PROVISIONAL PATENT APPLICATION

A provisional patent application filed on this invention on Jan. 03, 1997 by the same inventor received application Ser. No. 60/034,216.

FIELD OF THE INVENTION

THis invention relates to apparatus and process for the creation of activated carbon, and more particularly, to an apparatus and process for the creation of activated carbon not only from spent activated carbon which usually is electrically conductive but also from carbonaceous raw materials such as coconut shells, wood chips, saw dust, and coal products which usually are not electrically conductive.

BACKGROUND OF THE INVENTION

Today carbon is activated from materials such as coconut shell char, and reactivated from materials such as spent or exhausted petroleum coke saturated by exposure to gasoline vapors, by electrical resistance heating in the presence of steam. The conversion of carbonaceous raw materials such as coconut shells, wood chips, saw dust and coal products, by the same apparatus and process is precluded because the carbonaceous materials usually are not electrically conductive. A separate conversion apparatus and process is required.

PRIOR ART

U.S. Pat. No. 5,406.582 issued Apr. 11, 1995 to Cornelius du Plessis, discloses an apparatus and process for activating carbon and reactivating spent carbon by electrical resistance heating in the presence of steam. In du Plessis, a gravity-feed apparatus includes a reactor that consists of two or more sequential tubular sections of refractory material. Each section of tubular refractory material contains a portion of a descending column of carbon feedstock, a steam jacket at the lower end of the refractory material that surrounds the column at its lower end and is provided with orifices that inject the steam at more than one distance from the central axis of the carbon feedstock column, and a graphite block at the upper end of the tubular refractory material serving as an electrode to introduce electric current into the descending column. The graphite block is positioned at the center of the top of the section by attachment to a steel plate that includes either a flat or V-shaped shelf and that is provided with openings to allow the escape of released gases and vapors.

Each steam jacket assembly, together with its adjacent portion of the tubular reactor, also serves as heat exchanger, whereby the hot carbon gives up some of its heat to the incoming steam and thereby superheats it.

SUMMARY OF THE INVENTION

Accordingly, it is an object of the invention to provide an apparatus and process for making activated carbon from carbonaceous raw materials.

Another object of the invention is to provide an efficient apparatus and process for making activated carbon from carbonaceous raw materials.

Still another object of the invention is to provide an efficient apparatus and process for making carbon from carbonaceous raw materials.

Yet another object of the invention is to provide apparatuses and processes which are reliable in operation and easy of control.

A further object of the invention is to provide apparatus which is inexpensive of construction and easy of installation and use.

A still further object of the invention is to provide a new and efficient apparatus and process for converting a carbonaceous raw material into a carbonized material.

An additional object of the invention is to provide an inexpensive process for converting a carbonaceous raw material into a carbonized material.

A yet further object of the invention is to provide an apparatus and process for converting a carbonaceous raw material into a carbonized material that is advantageously combined with a reactor for activating or reactivating carbon.

A still further object of the invention is to provide an apparatus which can be used for creating activated carbon from both carbonaceous raw materials as well as spent carbon.

The objects of the invention are achieved by inserting before the carbon activator or reactivator section of existing apparatus, a carbonizing section achieving pyrolysis in a vertical tube by burning in a combustion box at the bottom of the carbonizing section gases released in the carbonizing section and in the lower reactor sections of the apparatus. Gasses generated from the heated feed stock of carbanaceous raw materials in the carbonizing section, flow down the tube with the feed stock through a product and gas separator where they are dissevered into a combustion box and ignited together with the gases flowing upwards from an adjacent lower reactor section. The ignited gas flows outward into a shell about the tube, rises therein to heat through the tube the feed stock, and then passes out via a chimney. The now carbonized feed stock continues its downward movement through the combustion box and enters the upper end of the adjacent reactor section through openings which also accommodate the upward movement of gasses from the reactor section into the combustion box.

BRIEF DESCRIPTION OF THE DRAWINGS OF A PREFERRED EMBODIMENT

These and other objects, features and advantages of the invention will become apparent from a reading of the following description, when considered with the appended drawings, of a preferred embodiment of the invention wherein.

DETAILED DESCRIPTION OF THE PREFERRED EMBODIMENT OF THE INVENTION

Figure 1:
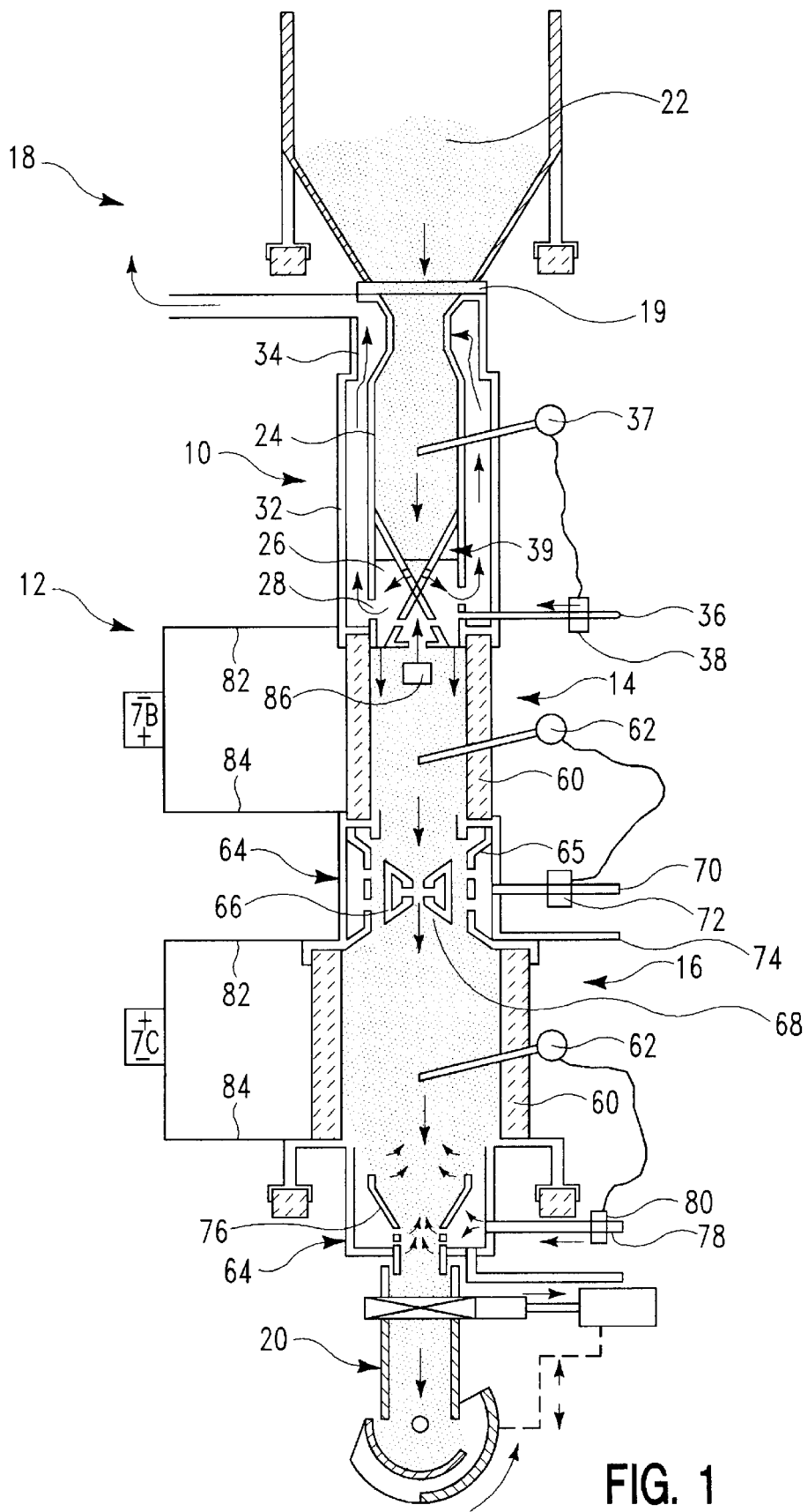
FIG. 1 is a cross-sectional, partly schematic, front view of the apparatus including a carbonizing section for carbonizing non-conductive carbonaceous materials and a reactor for activating carbonized products.

Referring now to FIG. 1 of the drawings in particular, there is shown an apparatus for creating activated carbon not only from spent or exhausted activated carbon which is electrically conductive, but also from carbonaceous raw materials which usually are not electrically conductive. The apparatus consists of a carbonizing section generally indicated by the numeral 10, and a downstream reactor generally indicated by the numeral 12. The reactor 12 is made up of two more or less similar and vertically-aligned sections generally indicated by the numerals 14 and 16, one or both of which are employed according to the effort necessary to activate to the desired extent particular carbonized materials. More reactor sections may be employed if necessary.

A feed hopper by which feed stock such as carbonaceous raw materials is supplied by gravity into the carbonizing section 10 directly below it, is generally indicated by the numeral 18. The supplying of feed stock is regulated by an otherwise airtight gate valve 19 to limit any upward flow of gases from the carbonizing section.

A conventional depository, generally indicated by the numeral 20, is mounted on the bottom of the lower reactor section 16 to collect activated carbon and hold the same for discharge into appropriate containers.

As shown in FIGS. 1–4, the carbonizing section 10 holds a column of feed stock 22 mainly in a tube 24 formed of a corrosion-resistant material (e.g. stainless steel) suitable to sustain the heat generated by a pyrolysis process. The pyrolysis process is initially induced by starting a fire using extraneous ignitable materials such as alcohol, in a combustion box 26 formed in the lower end of the tube 24. Holes 28 in the sides of the combustion box 26 allow the burning (and expanding gases) to flow into a restricted space surrounding the tube 24 to heat the tube and hence the feed stock 22 inside it. The application of heat to the feed stock 22 causes it to exude gases which flow downwards because the upper end of the tube 24 adjacent the feed hopper 10, is closed off by the air-tight gate valve 19. Thus the feed-stock exuded gases are supplied downward to the combustion box 26 wherein they ignite and replace the extraneous material as the source of heat for continuing the pyrolysis.

The restricted space about the tube 24 wherein the burnt hot gases heat it, is defined by shell 32 about it. Like the tube 24, the shell 32 may be formed of a corrosion-resistant material such as stainless steel. The shell 32 at its upper end may join the tube 24 to close off the restricted space except for a chimney 34 which may be designed so as to exhaust the burnt gases in a convenient place. A pipe 36 extending through the sides of the shell 32 and tube 24, supplies the air needed for combustion to take place in the box 26. A thermocouple 37 reaching into the middle of the down-flowing feed stock 22, measures the feed-stock temperature and electrically controls through a valve 38 the amount of air flowing through the pipe 36 into the combustion box 26 to limit combustion when the temperature in the feed stock reaches a predetermined point for the particular carbonaceous raw material constituting the feed stock 22.

The feed stock 22 gases exuded during the pyrolysis are supplied to the combustion box 26 through a product and gas separator generally indicated by the numeral 39 situated above and within the combustion box 26. Not only does the separator 39 separate the exuded gases from the feed stock 22 being pyrolized, but it also restrains the downward movement of the now carbonized carbanaceous raw materials which were the feed stock 22 to allow a combustion space to exist therebelow in the combustion box 26 and through which the separated carbonized product may rapidly fall to the reactor 12 without danger of burning.

Figure 2:
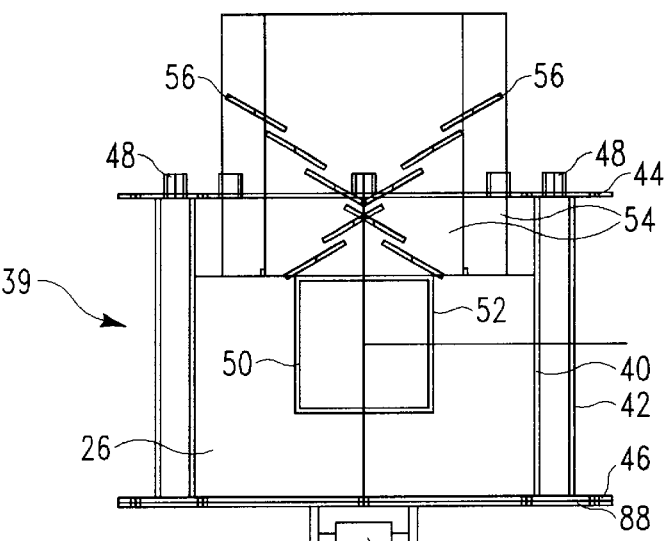
FIG. 2 is an enlarged vertical cross-sectional view of the bottom of the carbonizing section showing its combustion box and the gas and carbonized product separator directly above it.
Figure 3:
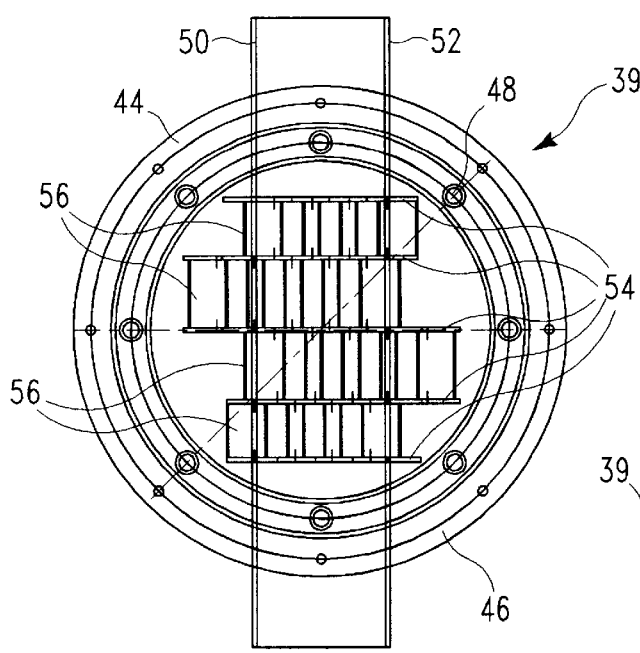
FIG. 3 is a plan view of the combustion box and the gas and carbonized product separator of FIG. 2.
Figure 4:
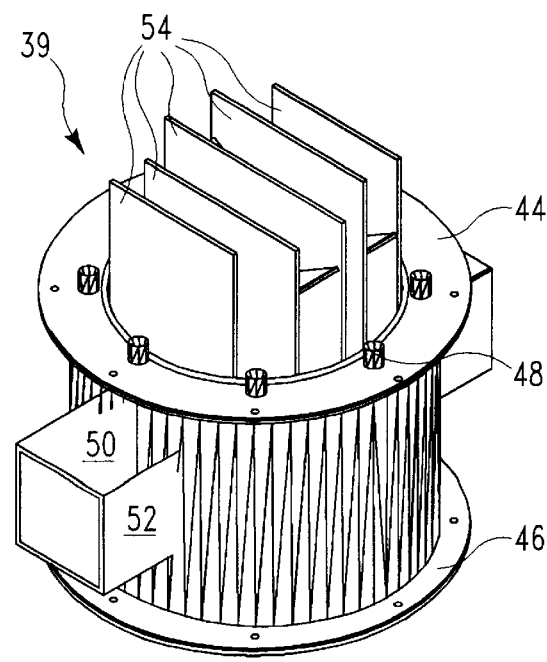
FIG. 4 is view in perspective of the combustion box and the gas and carbonized product separator of FIGS. 2 and 3.

The product and gas separator 39, shown diagramatically as two inclined plates in FIG. 1, is shown more specifically in FIGS. 2–4 and as incorporated on the upper part of the combustion box 26. The combustion box 26 is constructed of spaced inner and outer concentric cylinders 40 and 42 secured in place as by welding to upper and lower flanges 44 and 46. The upper flange 44 mounts a series of circumferentially spaced nozzles 48 which emit burnt gases coming from the combustion box through perforations in the inner cylinder 40 into the restricted space between tube 24 and the shell 32.

The product and gas separator 39 is incorporated on the combustion box 26 by being mounted on top of two spaced vertical plates 50 and 52 extending horizontally through the concentric cylinders 40 and 42 forming the sides of the combustion box 26. Mounted cross-wise on the upper edge of the vertical plates 50 and 52 are a series of five spaced apart vertical plates 54 that extend upward into the tube 24. Between sets of adjacent vertical plates 54 are sets of five staggered overlapping plates 56 extending downwardly from one side to the other to form ladders, adjacent sets of overlapping plates 56 or ladders extending in opposite directions. As the feed stock 22 is turned in to carbonized particles by the pyrolysis and reach the product and gas separator 39, the product particles tumble down the ladders to their lower ends and fall through the combustion box 26 and into the reactor 12. The gases exuded from the pyrolized feed stock 22 freely move away in the separator from the particles and down into the combustion box 26 on account of pressure from above, for their ignition and the heating of subsequent feed stock.

The reactor 12, shown consisting of two sections 14 and 16, too is a gravity-feed apparatus. Each section includes a tube 60 of refractory material, the tube for the second section 16 being of somewhat larger diameter than that for the first or upper section 14. Activation of carbon in the column of carbonized particles is effected by subjecting the length of the carbon in a tube 60 to an electrical charge and to steam rising up through the tube. A thermocouple 62 in each section controls the rate of steam introduction to regulate the activation temperature in each section.

Each section at the lower end of the tubular refractory material has a steam jacket generally indicated by the numberal 64 that surrounds the carbon column at its lower end and is provided with orifices that inject the steam at more than one distance from the central axis of the carbon column. Each steam jacket assembly, together with its adjacent portion of the tubular reactor, also serves as heat exchanger, whereby the hot carbon gives up some of its heat to the incoming steam and thereby superheats it.

The steam jacket 64 for the upper reactor section 14 is of the double conical plate type having an outer double cone element 65 perforated on its inner face with steam outlet openings and an inner double cone element 66 formed about a center opening 68 and perforated with steam outlet openings on its inner face about the center opening 68 and on its outer face opposite the outer double cone element inner face. Steam is admitted into the chamber formed between the outer double cone element 65 and the exterior wall of the jacket 64 via a pipe 70 through a valve 72 electrically controlled by the thermocouple 62. The inner double cone element 66, suitably supported by the outer double cone element 65, is also in steam communication therewith. A pipe 74 drains steam condensate from the steam jacket 64. The steam is superheated by the descending hot carbon column.

The steam jacket 64 for the lower reactor section 16 is of the single conical plate type having a central element 76 open wide at the top for receiving activated carbon and open narrow at the bottom for passing the activated carbon on through to the depository 20. The central element 76 forms a steam chamber between it and the outer wall of the steam jacket and is provided on its interior faces with two sets of orifices, an upper set and a lower set at different distances from the central axis of the carbon column to distribute low pressure and temperature steam uniformly through the descending carbon column, the steam being then rapidly superheated by the hot carbon. Steam is admitted into the chamber formed between the central element 76 and the exterior wall of the jacket 64 via a pipe 78 through a valve 80 electrically controlled by the section thermocouple 62.

The length of the carbon in each section tube 60 of the reactor 12 is subjected to an electrical charge through electrical terminals 82 and 84 respectively at the top and bottom thereof and connected to suitable DC or AC independent power supplies. The terminal 82 for the top section 74 may be connected to a conventional graphite block 86. The graphite block is positioned at the center of the top of the section by attachment to a steel plate 88 (FIG. 2) that is provided with openings not only to allow the carbonized feed stock particles to fall through to the reactor, but also to allow the escape of released gases and vapors into the carbonization section combustion box 26 to provide additional fuel for the pyrolyzing process. The terminal 84 may use the double cone element as the other electrode.

The length of the carbon in the tube 60 of bottom section 16 is subjected to an electrical charge via the electrical terminals 82 and 84 connecting the terminal 82 to the double cone element and the terminal 84 to the single cone element 76.

The depository 20, mounted on the bottom of the lower reactor section 16, collects the now activated carbon from the reactor 12 via the narrow opening in the bottom of the central element or single cone element 76 of its lower section 16. The depository 20, of conventional construction and provided with suitable control valves and sensing devices, receives and holds the activated carbon for discharge into appropriate containers.

In operation, carbonaceous raw materials 22 will have been placed in the feed hopper 18 and the air-tight gate valve 19 operated to fill the tube 24 of the carbonizing section 10 with carbonaceous raw materials. A fire will be started in the combustion box 26 using extraneous materials and the hot gases therefrom will pass therefrom through its openings 28 into the restricted space between the tube 24 and the outer shell 32 to heat the tube 24 and pyrolize the feedstock within it, and then out through the chimney 34. The pyrolizing feed stock will emit gases and vapors which because of the air-tight gate valve above, flow downwards into the combustion box to fuel the fire therein. Air is admitted into the combustion box 26 via the pipe 36. When the temperature of the feedstock reaches a predetermined point, the thermocouple senses it and reduces the air flow to limit combustion and in turn further heating of the feed stock.

The carbonized feed stock flows downward under gravity and through the product and gas separator 39, the emitted gas and vapors being released into the combustion box 26 while the carbonized product particles fall rapidly through the combustion box 26 and through the openings in the plate 88 and into the refractory tube 60 of the upper section 14 of the reactor 12. In the refractory tube 60 the now carbonized feed stock is subjected to electrical resistance heating via the graphite electrode 86 connected to the terminal 82 and the double cone element of the steam jacket 64 as the other electrode connected to the terminal 84, and to steam from the steam jacket 64 as an activating gas, to induce activation in the refractory tube 60 materials. The appropriate temperature is maintained in the carbonized feed stock through the thermocouple 62 controlling the inlet valve for the steam pipe 70. While the activated carbon product moves downward through the steam inlet into the tube 60 of the second reactor section 16, gases and vapors emitted during the activating process move upwards through the openings in the plate 88 and into the carbonizing combustion box 26 to fuel the fire therein.

The second reactor section 16 receives the partially activated carbon product from the first section 14 via the openings in the double cone element. The carbon product is received in the refractory tube 60 which may be of different dimensions than the tube 60 of the first section in order to accommodate particular carbonaceous materials and/or particular uses to be made of the finished activated carbon product. In the second reactor section refractory tube 60, the now partially-activated carbonized feed stock is subjected to further electrical resistance heating via the double cone element of the steam jacket 64 connected as the electrode to the terminal 82 and the single cone element 76 as the other electrode connected to the terminal 84, and to steam from the steam jacket 64 as an activating gas, to induce activation in the refractory tube 60 materials. The appropriate temperature is maintained in the carbonized feed stock through the thermocouple 62 controlling the inlet valve for the steam pipe 70. The now further activated carbon flows down through the bottom opening in the single cone element 76 via gravity, for reception in the depository 20 and conventional disposal thereafter.

While there has been shown and described a preferred embodiment of the invention, it will be apparent to those skilled in the art that other and different applications may be made of the principles of the invention. It is desired therefore to be limited only by the scope of the appended claims.

What is claimed is:

1. An apparatus for carbonizing carbonaceous raw materials, comprising a tube having a bottom for holding a column of carbonaceous raw materials, a mechanism for subjecting the column to heat and pyrolysing the raw materials to produce a carbonized product and gases and vapors and deliver them through the bottom of the tube, and a device for burning the gases and vapors at the bottom of the tube and using the heat generated thereby to heat the column, wherein the burning device includes a separator to dissever the gases and vapors from the carbonized product wherein the burning device includes a combustion box and the separator is mounted above the combustion box and restrains downward movement of the column, wherein the carbonized product is delivered through the bottom of the combustion box, and the apparatus further includes a reactor for receiving the carbonized product and activating it and for passing by-product gases and vapors thereof to the combustion box for burning.

2. An apparatus according to claim 1, wherein the reactor is positioned below the combustion box to directly receive the carbonized product by gravity and deliver the by-product gases and vapors upwards.

3. An apparatus according to claim 2, wherein the reactor receives the carbonized product in a column and activates the carbonized product by electrical resistance heating and subjection to steam.

4. An apparatus according to claim 3, wherein the reactor subjects the carbonized product to steam through a double cone steam jacket.

5. An apparatus according to claim 4, wherein the double cone steam jacket injects steam into the reactor column of carbonized materials at different distances from the center of the column.

6. An apparatus according to claim 3, wherein the reactor includes a sequential section for further activating the partially activated carbonized product by additional electrical resistance heating and subjection to steam.

* * * * *